United States Patent Office 3,582,511
Patented June 1, 1971

3,582,511
PROCESS FOR FORMING IMPROVED WATER SOLUBLE, SELF CURING, THERMOSETTING RESINS
George Jalics, Rocky River, Ohio, assignor to The Glidden Company, Cleveland, Ohio
No Drawing. Filed Nov. 29, 1967, Ser. No. 686,766
Int. Cl. C08f *45/21;* C09d *5/02*
U.S. Cl. 260—29.6      2 Claims

ABSTRACT OF THE DISCLOSURE

This invention relates to copolymers which are soluble in water to appreciable concentration by virtue of their content of modified amide units having the general formula:

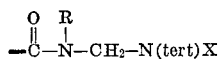

wherein R represents a member of the group consisting of hydrogen and alkyl radicals having not more than 3 carbon atoms; N (tert) represents the molecule of a tertiary base; and X represents the anion from a salt-forming acid.

In addition, the modified amide unit will decompose under the influence of heat with the copolymer self-curing to form a substantially water-insoluble thermosetting resin.

Also set forth are processes for making the copolymer by incorporating into the copolymerization reaction or reaction product, modified amide units in a partially completed state, and then completing the modification when necessary; or alternately, incorporating in the copolymer reaction products the modified amide units in the fully completed state.

In addition, there are set forth coating, impregnating, and electrocoating bath compositions comprising aqueous solutions of said copolymer; and processes for coating and impregnating a substrate which comprises applying the aqueous solution to the substrate and heating to drive off the tertiary moiety and leave a polymeric residue. The electrocoating bath composition can be applied by electrodeposition techniques.

---

One aspect of this invention relates to copolymers having water solubility and, in addition thereto, decompose under the influence of heat and self-cure to form a substantially water-insoluble thermosetting resin. More specifically, the invention relates to an improvement in a process for forming copolymers, namely, including sufficient modified amide units in the copolymer backbone to render the copolymer water soluble. These modified amide units can be described generally as a quarternary ammonium compound attached to an amide unit.

Another aspect of the invention relates to processes for making these water-soluble copolymers.

The invention also relates to coating and impregnating compositions that can be applied by conventional means and subsequently cured to form a substantially water-insoluble copolymeric residue. More specifically, this aspect comprises forming a stable aqueous solution of the copolymer, applying the solution containing the copolymer to a substrate and heating to drive off the tertiary base contained in the modified amide unit. A copolymeric residue is deposited on or within the substrate.

In addition, the invention also relates to electrocoating bath compositions and a process for coating a cathode with the copolymer electrolytically.

The invention, in the broadest aspect, is an improvement in the process for copolymerizing a mixture of unsaturated compounds under copolymerizing conditions for forming a copolymer therefrom. The improvement comprises including in the copolymer sufficient units of a modified amide for rendering the copolymer soluble in water. The modified amide units have the following general formula:

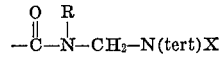

wherein R represents a member of the group consisting of hydrogen and alkyl radicals having not more than 3 carbon atoms; N (tert) represents the molecule of a tertiary base; and X represents the anion of a salt-forming acid.

In the formula as previously described, the modified amide unit, whether formed prior to polymerization or subsequent thereto, is substituent to a vinyl or lower alkyl vinyl unit having from 3 to 6 carbon atoms. Specific examples of these radicals include the vinyl, allyl, butenyl and pentenyl radicals.

By copolymerizable unsaturated compounds, I refer to unsaturated compounds that can be copolymerized with acrylamide or amide members of the acrylic and methacrylic acid series as hereinafter defined and including either acrylamide or amide members of the acrylic and methacrylic acid series. Unsaturated compounds other than acrylamide can be of the olefin or alkyne series. In addition, they can contain more than one unsaturated unit in the structure. In practicing the invention, it has been found that these compounds should not usually contain more than 20 carbon atoms. If there are more than 20 carbon atoms, the unsaturated unit usually becomes less reactive and is, therefore, less satisfactory for polymerization. I prefer to use unsaturated compounds having 12 or less carbon atoms in the molecular structure, because they are usually readily copolymerizable with amide members of the acrylic or methacrylic acid series. Typical and preferred unsaturated olefin compounds, and substituted olefinic compounds include acrylonitrile, acrylic and methacrylic esters such as methyl methacrylate, methylacrylate, etc., styrene, and derivatives thereof, and butadiene. These compounds, in addition to being readily polymerizable to form copolymers, have excellent properties for electrocoating, surface coatings, paints, impregnating coatings, and the like.

These copolymerizable unsaturated compounds can also be substituted. Typical substitutional groups include methyl, ethyl, propyl, chloro, bromo, esters, nitrile, and sulfate radicals.

By amide members of the acrylic and methacrylic acid series, I refer to those compounds that have at least one vinyl unit, one amide or amide-forming unit, and from 3 to 6 carbon atoms in the structure. A vinyl unit, as is well known in the art, is depicted by the general formula $CH_2=CH—$. By an amide-forming unit, I refer to those units that can usually be converted to the amide form. Typical and well known units include the carboxylic acid, nitrile, acid anhydrides, esters, and acylhalide. Typical amide members of the acrylic and methacrylic acid series, then would include:

Acrylamide, methacrylamide, acrylic acid, methacrylic acid, acrylonitrile, methacrylonitrile, acrolein, methacrolein, acrylic acid chloride, 1-butene amide, 1-pentene amide, pentenic acid, butenic acid, and hexenic acid.

Although not intending to be bound by theory, it is believed that the key to obtaining water solubility lies in substantially uniformly spacing the modified amide units along the backbone of the copolymer. If the modified amide units are bunched, usually only part of the copolymer will be water soluble and the remainder of the copolymer practically water insoluble. However, if a corresponding number of modified amide units were uniformly spaced in the copolymer backbone, the total copolymer will usually be water soluble.

In the formula illustrating the modified amide unit, R represents a hydrogen atom, or lower alkyl radical. By alkyl radicals, I refer to those selected from the group consisting of methyl, ethyl and propyl radicals. It is important to note that when alkyl radicals are added to the amide unit, they usually have a tendency to reduce the water solubility of the copolymer. It is believed the decrease in water solubility is caused by the increased carbon content added to the copolymer and, to achieve water solubility, a higher gram equivalent of modified amide units per 100 grams of copolymer is usually required.

The methylene radical as depicted by —$CH_2$— in the formula describing the modified amide unit is introduced by reacting formaldehyde, or a form thereof, with the amide unit. Examples of the formaldehyde forms are paraformaldehyde and trioxane.

N (tert) in the formula represents the molecule of a tertiary base. More specifically, this compound is a tertiary amine that will form a quaternary ammonium compound. The tertiary amine can be heterocyclic or aliphatic. Typical heterocyclic tertiary amines include pyridine and homologues thereof, picoline, and quinoline. Typical aliphatic tertiary amines include trimethyl amines, triethyl amines or dialkylcyclohexylamines. In practicing the invention, I prefer to use pyridine because it quaternizes easily and is relatively inexpensive.

In the formula, X represents the anion of a salt-forming acid and can be either organic or inorganic. Included as organic anions are the acetate, formate, propionate, butyrate and tartrate radicals. Examples of inorganic anions include the halogens, such as the bromide, chloride, or iodide, and phosphate and sulfate radicals.

The selection of the salt-forming acid can be important for at least two reasons:

(a) The anion can either remain in the residue or be driven off with the tertiary base when heated in the curing step; and (b) the anion can at various stages in the process convert to the acid form, and this acid may be highly corrosive.

To illustrate this problem, assume X represents a phosphate or butyrate anion. These anions convert to acids having fairly high boiling points, the former decomposing with heat leaving the phosphate anion and the latter having a boiling point of about 164° C. Therefore, if in the curing step a temperature of at least 164° C. is not achieved, it may be possible to substantially cure the copolymer and yet not remove the butyrate anion. Sufficient time may not have elapsed for substantial removal. In almost all cases, the phosphate anion will remain. On the other hand, if X represents a chloride anion, hydrochloric acid will form on conversion of the anion and be driven off with tertiary base when heated during the curing stage. As is well known, hydrochloric acid is highly corrosive and requires special equipment; all of which is very costly. In practicing the invention, I prefer to form the modified amide unit using hydrochloric acid, or a mixture of halogen and organic acids, such as hydrochloric acid and acetic. Hydrochloric acid or the mixtures of acids readily react with the tertiary base to form the quaternary ammonium compounds. On completing the formation of the modified amide unit with hydrochloric acid, it is possible to substitute an acetate anion for the chloride prior to heating to drive off the tertiary base. However, the substitution can be completed in one step. As is well known, the acetic acid that is formed is less corrosive than the hydrochloric acid.

By a water soluble copolymer, I mean that the copolymer will form a stable aqueous solution to yield at least 5% by weight of copolymer at 20° C. The solution is usually clear. These compositions are substantially stable in that the copolymers will remain in solution without requiring mechanical means of agitation, additives, or emulsifying agents.

Solubility of the copolymer is usually dependent on the number of modified amide units included in the copolymer. The modified amide units are considered functional in that they cause the copolymer to become water soluble. Therefore, as a lower limit, I include in the copolymer a sufficient amount of modified amide units to render the copolymer water soluble. I have found that a copolymer of substantially methyl methacrylate and ethyl acrylate usually requires about 0.05 gram-equivalent of acrylamide per 100 grams of copolymer before attaining water solubility. The upper limit of modified amide units is usually related to the type of copolymer desired and the copolymer can usually contain at least 1 to 1.4 gram-equivalents per 100 grams copolymer without adverse effects. I prefer to use between 0.15 and 0.3 gram-equivalent acrylamide per 100 grams of copolymer.

To form the water soluble copolymers, there are at least three alternative routes. They are:

(a) copolymerize an amide member of the acrylic acid series with copolymerizable unsaturated compounds to form a copolymer therefrom, and then formed the modified amide unit on the copolymer;

(b) form the modified amide unit onto the amide member of the acrylic acid series and copolymerize with the copolymerizable unsaturated compounds;

(c) form a partially completed modified amide unit onto the amide member of the acrylic acid series by leaving out a salt-forming acid, copolymerize with copolymerizable unsaturated compounds to form a copolymer therefrom, and then complete the conversion of the amide site to the modified amide unit by adding the salt-forming acid.

In practicing the invention, I can use in the polymerization of the monomers such conventional methods as emulsion polymerization, solvent polymerization and graft polymerization. These techniques are well known in the art and need not be described. In practicing the invention by the processes described in parts (b) and (c), the polymerization temperatures should be maintained at a temperature of 100° C. or below. If the temperature is above 100° C., some of the tertiary base will usually be driven off, thus affecting the water solubility characteristics of the resin.

In practicing the invention to form the modified amide unit onto an amide site, I usually add substantially stoichiometric amounts of an aldehyde, tertiary base, and a salt-forming acid with the amide site. Typically, the reactants are formaldehyde, phosphorous trichloride, and pyridine. An excess of reactants is usually not harmful to the reaction or to the copolymer but it does reduce the economy of the process.

In forming the modified amide unit, it is preferred to keep the system substantially devoid of such groups as the hydroxyl, carboxylic acid, and amine radicals. These radicals are readily reactive with the aldehyde compound, and as a result cause undesirable compounds to be formed. However, once the modified amide unit is completely formed, it is relatively stable and these groups do not usually react to destroy it.

A further feature of this invention relates to coating and impregnating compositions. These compositions, when applied, can be used as surface coatings, film-forming coatings or an improvement as an additive to film coatings and surface coatings. These compositions comprise about 1% to 50% by weight of copolymers in water.

Additionally, the invention relates to electrocoating bath compositions comprising aqueous solutions of about 1% to 40% of the copolymer by weight of bath.

Various acid binding agents may also be added to the bath compositions to prevent possible injury to the substrate. Illustrations of such compounds include borax, magnesium hydroxide, pyridine, aniline, and weakly basic substances such as sodium acetate, and other buffers. Acetic acid, phthalic acid, or other mild acid can also be present if desired.

If desired, other adjuvants may be added to the bath compositions for the purpose of facilitating the application of the copolymer or for purposes of their own specific function. Illustrations of such agents or pigments are magnesium sulfate, Japan wax, dextrine, gums, glues, china clay, tallow soaps, and carnauba wax.

In almost all of the coating and impregnating compositions, the cationic surface active modified amide unit usually tends to reduce bacterial attack. Thus, in the coating, impregnating, and electrocoating compositions, the copolymer acts and can be used as a bactericide and a nematocide. In addition to these properties, the compositions can be used as antistatic and emulsifying foam modifying agents.

In accordance with the practice of the invention, the compositions can be applied to a substrate by such conventional means as brushing, dipping and spraying techniques. These techniques are well known in the art and need not be described.

In addition to the conventional means of application, copolymer compositions can be applied by the relatively new process of electrodeposition. Broadly, this is a process for electrocoating a cathode which comprises using the electrocoating bath composition, establishing and maintaining the bath in an electrical contact with an anode and cathode passing direct current through the bath at a potential sufficiently high for causing electrodeposition of the composition. The electrodepositions processes are well known in the art and I refer to U.S. Pat. No. 3,230,162.

Subsequent to the application of the present compositions, the material is heated to a temperature of at least 100° C. driving off tertiary base to form a substantially water-insoluble copolymer residue. This heating step is herein referred to as the "curing" step. The lowest temperature in the curing step is that which will bring about substantial decomposition of the modified amide unit. The upper temperature-time parameters for curing the copolymer are dependent on the thermostability of the copolymer. The curing temperature is inversely proportional to the time required for the curing step. By this, I mean that when curing the copolymer at high temperatures, the time of the curing step should be reduced to a level that brings about a substantial cure without decomposition. For example, I can cure at a temperature of about 300° C. but the time of the cure step may be required to be as short as 30 seconds before decomposition takes place.

In accordance with the practice of the invention, I prefer to cure the copolymer at a temperature of about 100° C. to about 150° C. for about 10 to 30 minutes. I can dry the material after the compositions have been applied and prior to the curing step. However, this drying step is not a limitation on the invention since good results are obtained by omitting it. In other words, the drying step is merged into the curing step.

The curing step has as its object to decompose the modified amide unit liberating the tertiary base and leave behind a substantially water-insoluble copolymer residue. When the tertiary base is removed, it is believed the copolymer self-cures by cross-linking between the N–R group through the methylene radical. As a result of the cross-linking, the copolymer can become thermosetting. This reaction to form the insoluble copolymer is thought to be described by the general formula:

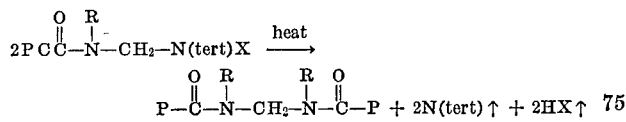

wherein P represents the copolymer and R, N (tert), and X are the same as they are designated in the general formula describing the modified amide unit.

The formula shows three of the beneficial properties of the copolymer which are water solubility, the decomposition under the influence of heat, and the self-curing mechanism to give a substantially water-insoluble thermosetting resin.

The following examples show ways in which my invention can be practiced, but should not be construed as limiting the invention. All parts are parts by weight and all weights weight percentages unless otherwise specifically designated in the specification.

EXAMPLE 1

Preparation of the copolymer

A pressure vessel was charged with 200 parts of methyl ethyl ketone (MEK) and heated to 120° C. When this temperature was reached, a mixture of the following composition was pumped into the reactor over a period of 2 hours while maintaining the charge at 120° C.:

200 parts of butyl acrylate, 100 parts of methyl methacrylate, 100 parts of styrene, 200 parts of acrylamide, 400 parts of ethyl acrylate, 80 parts of (MEK), 10 parts of benzoyl peroxide, and 5 parts of tertiary butyl perbenzoate.

When all in, the batch was held at the same temperature for 90 minutes to complete the polymerization. Then the batch was cooled to 40° C., and 100 parts of paraformaldehyde and 225 parts of pyridine were added to it. The reactor was resealed, heated and held at 105° C. for 75 minutes. When completed, the batch was cooled and filtered. To the residue thus obtained, 40 parts of phosphorous trichloride was added over a period of 2 hours between 50–60° C. First, the resin became cloudy and viscous, but gradually it cleared and became fully water-soluble. At this point 1000 parts of water was added to the resin and the MEK was removed under reduced pressure. The batch temperature was maintained between 50–60° C.

EXAMPLE II

Application and curing to form a thermosetting resin

Clear, hard, highly crosslinked films with excellent mar resistance were obtained with the resin obtained in accordance with Example I. The resin was pigmented with titanium dioxide and applied by brush on a hardboard panel. The applied resin was cured under low intensity infra-red lamps for 4 minutes while maintaining surface temperatures of about 275–300° F.

The foregoing examples illustrate the preferred way of practicing the invention but it is understood that other methods can be employed and remain within the scope of the following claims.

I claim:

1. In a process for forming a water soluble copolymer which comprises the steps of:
    (a) polymerizing a mixture of copolymerizable unsaturated compounds one or more consisting of a lower alkyl ester of a $C_1$–$C_8$ alcohol and $C_3$–$C_6$ acid of the acrylic acid series, butadiene, styrene, acrylonitrile and the other being an amide member of the acrylic or methacrylic acid series, said mixture having substantially no carboxyl groups, hydroxyl groups or amine groups therein, the improvement which comprises including from 0.05 to 0.6 gram-equivalents acrylamide member per 100 gram copolymer;
    (b) converting the acrylamide member in said mixture at a temperature not substantially above 100° C. to a unit having the following structure:

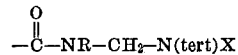

wherein R represents a hydrogen or methyl group, N(tert) represents a heterocyclic tertiary amine or tertiary alkyl amine and X represents an anion.

2. The process of claim 1 wherein the conversion of said amide member to said unit is accomplished by reacting said amide unit with said heterocyclic tertiary amine, formaldehyde and a chloride selected from hydrogen chloride or thionyl chloride, phosphorous trichloride or phosphorous pentachloride, at a temperature not substantially above 100° C.

References Cited

UNITED STATES PATENTS

| | | |
|---|---|---|
| 3,174,874 | 3/1965 | Fikentscher et al. 260—29.6XYHN |
| 3,178,385 | 4/1965 | Dinges et al. 260—29.6XYHN |
| 3,227,672 | 1/1966 | Fertig et al. 260—29.6HN |
| 3,296,167 | 1/1967 | Turner et al. 260—29.6HN |
| 3,308,081 | 3/1967 | Glabisch 260—29.6HN |
| 3,378,477 | 4/1968 | Gentles et al. 204—181 |
| 3,446,723 | 5/1969 | Pohlemann et al. 204—181 |
| 3,458,420 | 7/1969 | Spoor et al. 204—181 |

PHILIP E. ANDERSON, Primary Examiner

J. B. EVANS, Assistant Examiner

U.S. Cl. X.R.

117—42, 62.2; 204—181